April 20, 1965   F. HUBER ETAL   3,179,576
PROCESS FOR FABRICATING A CAPACITOR
Filed Nov. 29, 1960
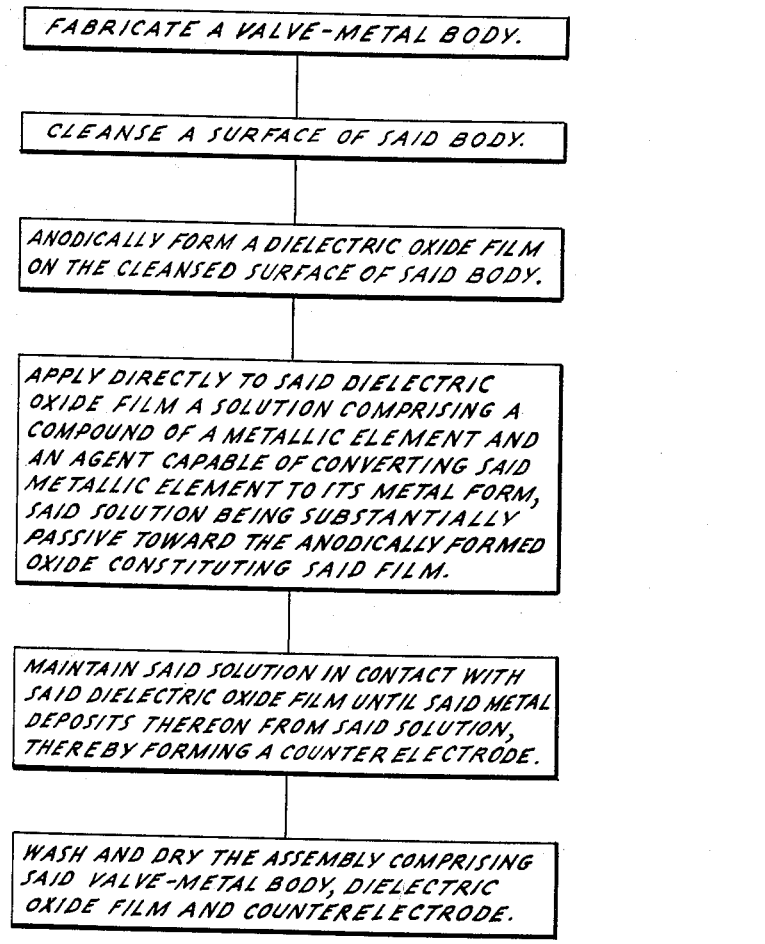
INVENTORS
FRANZ HUBER
MAIRE S. BLOMGREN
BY
Herbert Epstein
ATTORNEY 3,179,576
PROCESS FOR FABRICATING A CAPACITOR
Franz Huber, Valley Stream, N.Y., and Maire S. Blomgren, South Pasadena, Calif., assignors, by mesne assignments, to Philco Corporation, Philadelphia, Pa., a corporation of Delaware
Filed Nov. 29, 1960, Ser. No. 72,299
9 Claims. (Cl. 204—38)

This invention relates to a process for forming the counterelectrode of a capacitor comprising a valve metal as its other electrode and an oxide of the valve metal as its dielectric.

The increasing complexity of electronic equipment, e.g. computers, and the increasing use of such complex electronic equipment in aircraft has made it imperative that the volume of such equipment be minimized. To this end the volume of individual circuit components must be reduced. Since many capacitors are used in such equipment, a great need exists for capacitors having very high capacitances per unit volume.

To increase the capacitance-to-volume ratio of capacitors, it has been proposed to "print" the capacitor on an insulating substrate, for example by cathodically sputtering a thin film of tantalum on an insulating substrate, electrochemically oxidizing a portion of the tantalum to form the dielectric film of tantalum pentoxide, and applying a counterelectrode to this dielectric film by evaporating a metal thereonto through an appropriate mask. By the use of an ultra-thin oxide film as the dielectric, a capacitor having a relatively high capacitance per unit volume is obtained. However the foregoing evaporation method of applying the counterelectrode is disadvantageous because it requires the counterelectrode to be applied at relatively high temperatures in an evacuated container. Such high temperatures are sometimes injurious to the thin oxide film, and operations requiring a vacuum are inconvenient.

Another way to increase the capacitance per unit volume of a capacitor is to use a body of porous sintered tantalum as one of its electrodes. Such an electrode has an extremely high surface area per unit volume. Hence when this area is effectively utilized as a plate of the capacitor the resulting unit has a high capacitance per unit volume. In fabricating this type of capacitor by use of the prior-art method, an oxide dielectric film is formed on the surfaces of the pores by anodizing the tantalum body in an appropriate electrolyte. The counterelectrode is formed by dipping the porous electrode into an aqueous solution of manganous nitrate and heating the wet electrode sufficiently to evaporate the water and pyrolytically convert the manganous nitrate to manganese dioxide. To form a continuous layer of manganese dioxide on the tantalum oxide film it is necessary to apply several successive coatings of manganese dioxide thereto in this manner. Defects in the tantalum dioxide film which may develop during this pyrolytic process are then repaired by reanodization of the tantalum body, the final applications of manganese dioxide are made by the aforedescribed pyrolytic process and the external connection is made to the manganese dioxide layer by depositing thereon a film of finely dispersed graphite and thereafter depositing a layer of a lead alloy or copper onto that portion of the graphite film covering the exterior surface of the tantalum body. The aforedescribed process of forming the manganese dioxide counterelectrode and the graphite and metal connection thereto is disadvantageous because it requires many time-consuming steps to produce the successive layers of manganese dioxide on the tantalum oxide film and because it requires reanodization of the film.

Still others have proposed forming the counterelectrode by electroplating metal onto the dielectric film. However this process is unsatisfactory because the metal tends to electrodeposit most readily on those regions of the film which are thinnest or even defectively porous, because the electric field and the plating current density are most intense at these locations. Hence capacitors whose counterelectrodes are applied by electroplating frequently exhibit high leakage currents or even short circuits.

Another proposal for forming counterelectrodes is the chemical reduction to metal of a surface portion of the thin dielectric oxide film. Such a process is unsatisfactory since it tends to make the already thin oxide film porous and thereby cause the capacitor undesirably to exhibit a high leakage current.

Thus even though the art has developed several techniques for applying counterelectrodes to the dielectric films of capacitors, there is still a real need for a simple, non-destructive process for applying such a counterelectrode—a process by which the counterelectrode can be deposited onto the dielectric oxide film without chemically attacking it or destroying it by excessive heat, which does not require the use of vacuum, and which is relatively cheap and adaptable to performance by relatively unskilled personnel or machinery.

Accordingly an object of the invention is to provide a process for fabricating capacitors.

Another object is to provide a process for producing capacitors having a high capacitance per unit volume.

Another object is to provide a process for forming a counterelectrode of a capacitor.

Another object is to provide a process performable in the air for forming a counterelectrode of a capacitor.

Another object is to provide a process performable at relatively low temperatures for forming a counterelectrode of a capacitor.

Another object is to provide a process for forming a counterelectrode of a capacitor of the type having a valve metal electrode at least one of whose surfaces is coated with an oxide of the valve metal.

Another object is to provide a process for forming a counterelectrode on the oxide-film dielectric of a printed-circuit capacitor of the foregoing type.

Another object is to provide a process for forming a counterelectrode on the oxide-film dielectric of a capacitor having a porous metal body.

The foregoing objects are achieved by a process for fabricating a counterelectrode for a capacitor having an electrode composed of a valve metal and having on a surface of said electrode a dielectric layer composed of oxide of said valve metal, in which, in accordance with the invention, a solution containing a compound of a metallic element out of which the counterelectrode is to be formed and also containing an agent capable of reducing the metallic element in said compound to its metal form is applied to the dielectric layer. This solution is maintained in contact with the dielectric layer until said metal has deposited thereon.

In a specific form the valve metal is tantalum, titanium, aluminum or niobium. The dielectric film is composed of the oxide of the valve metal. The solution contains a compound of gold, silver or nickel and also contains an agent capable of reducing the gold, silver or nickel in said compound to its metal form. However the solution is substantially non-reactive with, i.e. passive toward, the valve-metal oxide.

The valve-metal electrode may have any one of numerous physical forms, e.g. a sputtered or evaporated film on an insulating substrate, a foil of the metal or a porous body composed thereof. Whatever the form of the body, the metal-depositing solution is able to deposit the counterelectrode metal over substantially all of the dielectric oxide coating on the valve-metal electrode. Accordingly in the case of a sintered body electrode, it is now possible to take advantage of the large effective area afforded by the interiorly positioned pores of such a body without having to heat to pyrolytic temperatures and without having to reanodize. Where the process of the invention is employed to provide counterelectrodes for printed capacitors, the plating solution can readily be localized to the dielectric oxide film by applying the plating solution thereto through an appropriately positioned aperture in a stencil held against the substrate. In addition additional apertures may be provided in the stencil such that metal is not only deposited on the dielectric oxide film to form the counterelectrode of the capacitor, but also is deposited onto the substrate adjoining the capacitor to provide electrial connections between the counterelectrode and other components of the printed circuits. The process of the invention is convenient because it may be performed in air and requires no electric current.

Other advantages and features of the invention will become apparent from the following discussion directed to examples of our method of forming counterelectrodes for valve-metal oxide capacitors. The steps of our method are set forth in a flow diagram constituting the single figure of drawing.

In a preferred embodiment of the invention, the valve metal employed is titanium; the dielectric film is composed of anodically formed titanium dioxide. The counterelectrode is composed of silver. The titanium electrode may be in the form of a thin film evaporated or sputtered in conventional manner onto an insulating substrate, e.g. glass, mica or ceramic. Prior to forming the oxide film thereon, the titanium electrode preferably is cleansed by chemical etching in a solution containing two parts by volume of concentrated hydrofluoric acid, two parts by volume of concentrated nitric acid and one part by volume of glacial acetic acid. Then the thin dielectric film of titanium dioxide is formed on the titanium body by anodizing it in a solution consisting essentially of four parts by volume of 1,2-propanediol, five parts by volume of water and sufficient oxalic acid to saturate the solution. This forming is performed at room temperature at a constant voltage whose value depends directly on the desired film thickness.

In accordance with the invention, the silver counterelectrode then is applied to the anodically formed titanium dioxide film by employing a chemical reduction technique heretofore used to form silver mirrors on glass, e.g. the Rochelle salts process described in the "Handbook of Chemistry and Physics," 31st Edition, Chemical Rubber Publishing Co., Cleveland (1949), at pages 2590 and 2591. In practicing the latter process two solutions are required. The first of these (the silver-supplying solution) is prepared by dissolving about five grams of silver nitrate in about 300 milliliters of distilled water, adding dilute ammonium hydroxide dropwise until the dark brown precipitate formed by the first additions of the ammonium hydroxide is nearly but not quite dissolved, filtering the solution and adding distilled water thereto to make about 500 milliliters. The second solution (the reducting solution) is prepared in the following manner. About one gram of silver nitrate is dissolved in a small quantity of water and is stirred into about 500 milliliters of boiling water. Next about 0.83 gram of Rochelle salts, i.e. potassium sodium tartrate, is dissolved in a small quantity of water and is stirred into the silver nitrate, boiling water solution. The resultant mixture is boiled for about one-half hour, until the gray precipitate formed therein collects as a powder on the bottom of the container. This mixture is filtered hot and water added thereto to make about 500 milliliters.

To apply the counterelectrode to the titanium dioxide film, the silver-supplying solution is applied to the region of the body on which the counterelectrode is to be formed and the reducing solution is added to the silver-supplying solution. Under these conditions, a tenacious, continuous film of silver metal deposits onto the titanium dioxide film. However the plating solution does not substantially react with the titanium dioxide film. Thereafter the assembly is rinsed in distilled water and dried by directing a current of air over it. Because the titanium dioxide film is substantially unaffected by the silver plating solution its electrial properties are not adversely affected by the plating step.

Where the titanium body filmed onto the insulating substrate is part of a printed circuit, the silver-depositing solution can be used not only to deposit the counterelectrode onto the titanium dioxide dielectric film anodically formed on the titanium film but also to deposit on the substrate silver leads connecting this counterelectrode to other components of the printed circuit. Such simultaneous deposition of the counterelectrode and of the connecting lead is easily achieved by applying the silver solution to the titanium oxide and substrate through an appropriately apertured stencil held against the substrate. Such a stencil typically is composed of rubber.

By practicing the foregoing process, extremely small, almost flat capacitors having high capacitances per unit volume are readily produced without chemical attack or thermal destruction of the dielectric oxide film, and without need for operation within a vacuum chamber. Moreover because of the nature of the metal deposition process, it is readily adaptable to the fabrication of capacitors having highly irregular shapes and surfaces.

The process as specifically described in the foregoing example is employed to form a silver counterelectrode on a titanium dioxide dielectric film formed on a titanium electrode. However the invention is not limited to the fabrication of counterelectrodes for this specific capacitor. On the contrary, the process also may be employed to form counterelectrodes on the oxides of the other valve metals, e.g. tantalum, aluminum and niobium. For example the process is particularly well suited for forming a counterelectrode for a capacitor having a porous, sintered tantalum body whose pore surfaces and exterior surface are coated with an anodically formed film of tantalum pentoxide. Such a film may be formed for example by employing the anodizing process described above. Because the plating solution can infiltrate the pores of the tantalum body and deposit a continuous layer of metal over the oxide film therewithin, this process is especially well suited for constructing capacitors whose capacitance per unit volume is unusually high because the large interior surface area of the pores is effectively utilized.

In addition a metal other than silver may be deposited as a counterelectrode on a valve metal oxide by the process of the invention. For example, gold or nickel films may be applied to tantalum pentoxide or titanium dioxide films as a counterelectrode. To deposit gold on such oxides, the following process may be employed: a gold-supplying solution is prepared by dissolving about two grams of gold trichloride and about ten grams of hydrochloric acid (specific gravity of about 1.18) in about 90 milliliters of distilled water, and adding sodium hydroxide to this solution until its pH is between about 8 and about 10. A gold-reducing solution is prepared by dissolving about 17.3 grams of Rochelle salts, i.e. potassium sodium tartrate, and about five grams of sodium hydroxide in about 50 milliliters of water. To deposit the gold film onto the dielectric oxide film, about five parts of the gold-supplying solution and about one part of the gold-reducing solution are mixed together and heated to a temperature between about 95° C. and 100° C. The mixture is applied to the dielectric film and maintained in contact therewith until a sufficient thickness of gold metal has deposited thereon to form a satisfactory counterelectrode. As in the case of silver, the gold so deposited forms a tenacious, continuous metal film on the oxide. The plating solution does not react substantially with the oxide film and hence does not deleteriously affect its electrical properties. Electrical connections can then be made to the gold film and the valve metal electrode in conventional manner.

To apply a nickel counterelectrode to a valve-metal oxide dielectric film, the following procedure may be followed: three solutions, hereinafter designated as solutions A, B and C, are prepared. Solution A consists essentially of a mixture of about 64 milliliters of distilled water, about two milliliters of glacial acetic acid and about 70 grams of nickel sulfate hexahydrate ($NiSO_4 \cdot 6H_2O$). Solution B consists of about 80 milliliters of water and about 30 grams of sodium acetate ($CH_3COONa \cdot 3H_2O$). Solution C consists of about 60 milliliters of water and about 72 grams of sodium hypophosphite ($NaH_2PO_2 \cdot H_2O$)

To plate the nickel counterelectrode onto the dielectric film, a mixture is formed of about 70 grams of distilled water, about 4.2 milliliters of solution A, about 4.2 milliliters of solution B and about 4.2 grams of ammonium chloride. This solution is heated to between about 90° C. and about 100° C. and applied to the dielectric film. Twenty milliliters of solution C are added thereto. The latter solution acts to reduce the nickel to its metallic form. The resultant solution is maintained in contact with the dielectric film until the nickel has plated onto the film in the desired thickness. Because the nickel-plating solution does not react substantially with the oxide film, the dielectric properties of this film are not deleteriously affected by this process.

While we have described our invention by means of specific examples, we do not wish to be limited thereto, for obvious modification will occur to those skilled in the art without departing from the scope of our invention.

What we claim is:

1. In a process for fabricating a counterelectrode for a capacitor comprising (1) an electrode composed of a valve metal anodically oxidizable to form thereon a dielectric oxide, and (2) a dielectric film formed on a surface of said electrode by anodically oxidizing said surface, the steps of applying directly to said film a solution for depositing on said film a metal selected from the group consisting of gold, silver and nickel, said solution being substantially passive toward said anodically-formed oxide constituting said film, and maintaining said solution in contact with said film until a layer of said selected metal deposits thereon from said solution, said solution for depositing said gold on said film consisting essentially of a mixture of an aqueous alkaline solution containing gold trichloride, and an aqueous solution containing potassium sodium tartrate; said solution for depositing said silver on said film consisting essentially of a mixture of an aqueous solution containing the reaction product of silver nitrate and ammonium hydroxide, and an aqueous solution containing the reaction product of silver nitrate and potassium sodium tartrate; and said solution for depositing said nickel consisting essentially of a mixture of an aqueous solution containing acetic acid, nickel sulfate, sodium acetate and ammonium chloride, and an aqueous solution containing sodium hypophosphite.

2. A process according to claim 1, wherein said valve metal is aluminum and said metal deposited on said film is silver.

3. A process according to claim 1, wherein said valve metal is niobium and said metal deposited on said film is silver.

4. In a process for fabricating a counterelectrode for a capacitor comprising (1) an electrode composed of a valve metal selected from the class consisting of tantalum and titanium, and (2) a dielectric film formed on a surface of said electrode by anodically oxidizing said surface, the steps of applying directly to said film a solution for depositing on said film a metal selected from the group consisting of gold, silver and nickel, said solution being substantially passive toward said anodically-formed oxide constituting said film, and maintaining said solution in contact with said film until a layer of said selected metal deposits thereon from said solution, said solution for depositing said gold on said film consisting essentially of a mixture of an aqueous alkaline solution containing gold trichloride, and an aqueous solution containing potassium sodium tartrate; said solution for depositing said silver on said film consisting essentially of a mixture of an aqueous solution containing the reaction product of silver nitrate and ammonium hydroxide, and an aqueous solution containing the reaction product of silver nitrate and potassium sodium tartrate; and said solution for depositing said nickel consisting essentially of a mixture of an aqueous solution containing acetic acid, nickel sulfate, sodium acetate and ammonium chloride, and an aqueous solution containing sodium hypophosphite.

5. A process according to claim 4, wherein said metal deposited on said film is gold.

6. A process according to claim 4, wherein said metal deposited on said film is silver.

7. A process according to claim 4, wherein said metal deposited on said film is nickel.

8. A process according to claim 4, wherein said valve metal is titanium, said dielectric film is composed of titanium dioxide, and said metal deposited on said film is silver.

9. A process according to claim 4, wherein said valve metal is tantalum, said dielectric film is composed of tantalum pentoxide and said metal deposited on said film is silver.

References Cited by the Examiner
UNITED STATES PATENTS

| | | | |
|---|---|---|---|
| 2,955,958 | 10/60 | Brown | 117—113 |
| 2,995,473 | 8/61 | Levi | 117—212 |
| 3,035,944 | 5/62 | Sher et al. | 117—217 |

FOREIGN PATENTS

| | | |
|---|---|---|
| 736,572 | 9/55 | Great Britain. |
| 160,620 | 1/55 | Australia. |

RICHARD D. NEVIUS, *Primary Examiner.*